April 17, 1956  R. T. SIMMONS  2,742,558
CONTROL FOR ELECTRIC OVENS
Filed Aug. 21, 1953  3 Sheets-Sheet 1
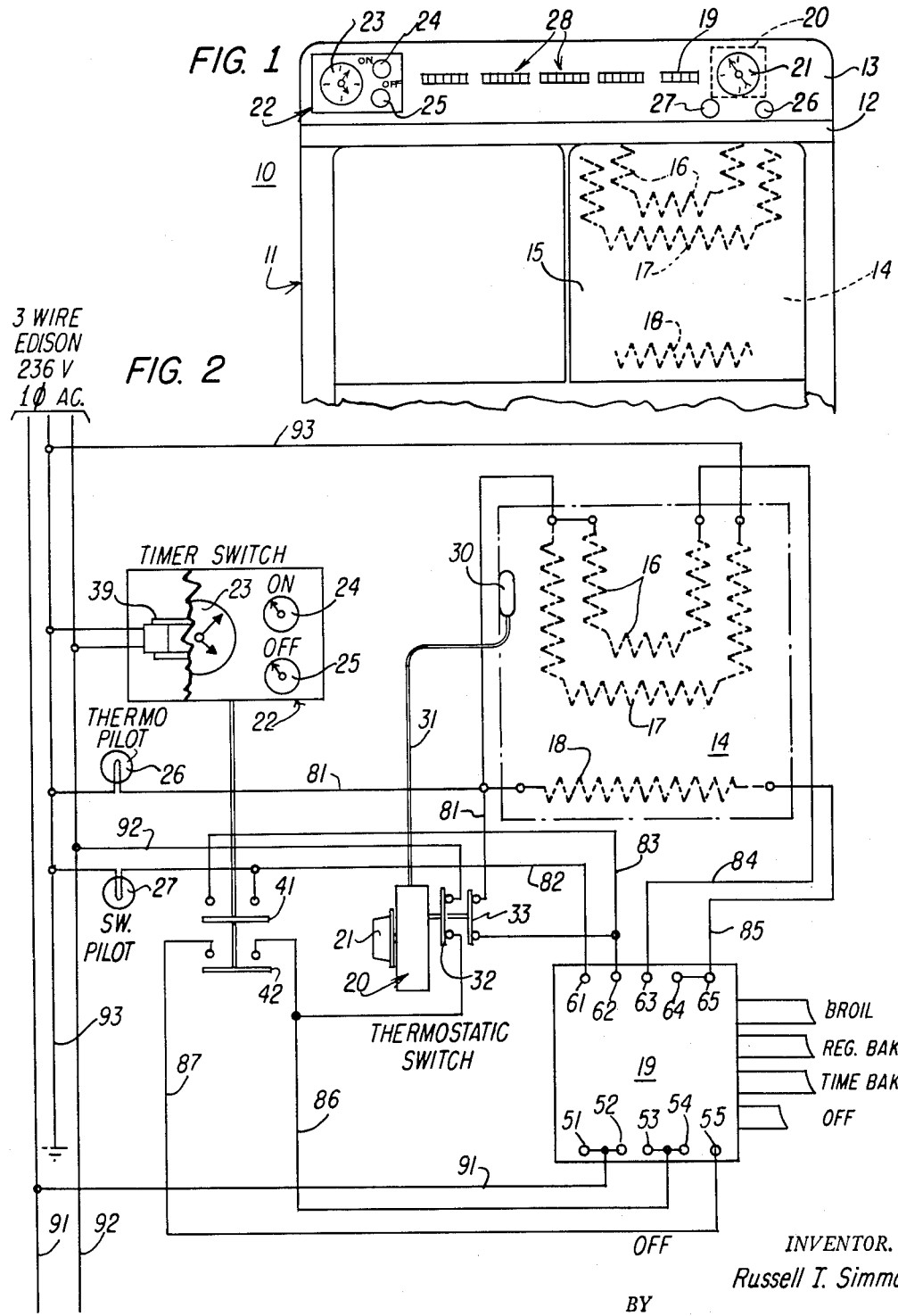
INVENTOR.
Russell T. Simmons
BY
Smith, Olsen, Baird & Gulbrandsen
Attys

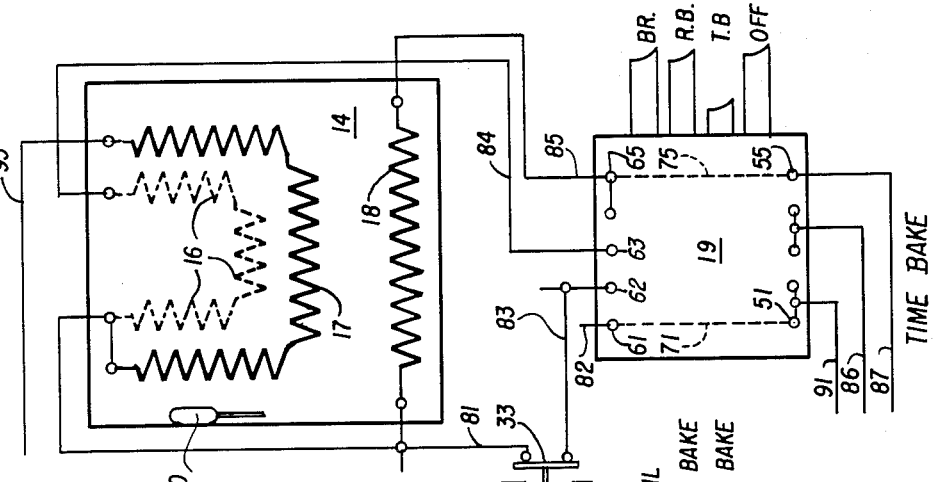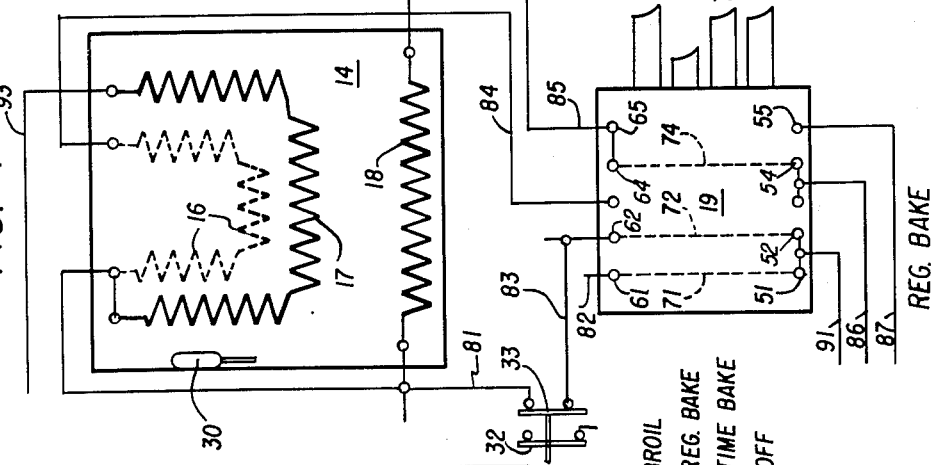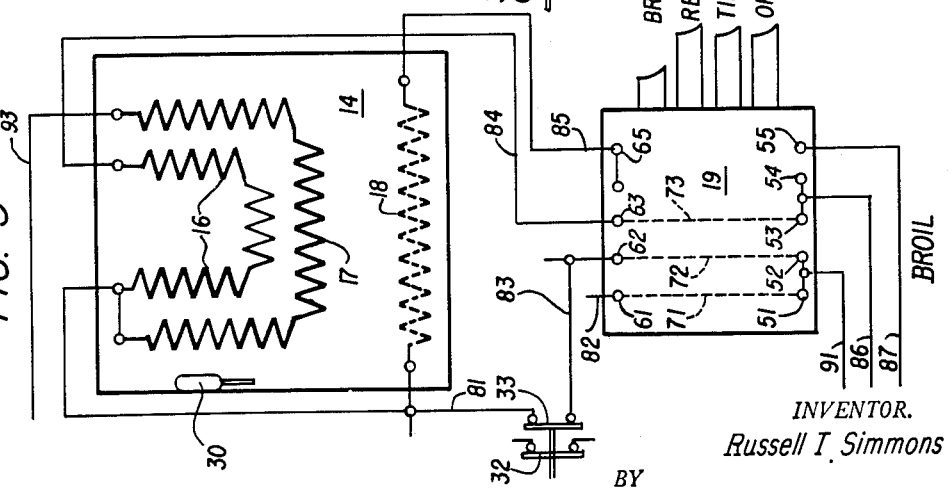

April 17, 1956  R. T. SIMMONS  2,742,558
CONTROL FOR ELECTRIC OVENS
Filed Aug. 21, 1953  3 Sheets-Sheet 3
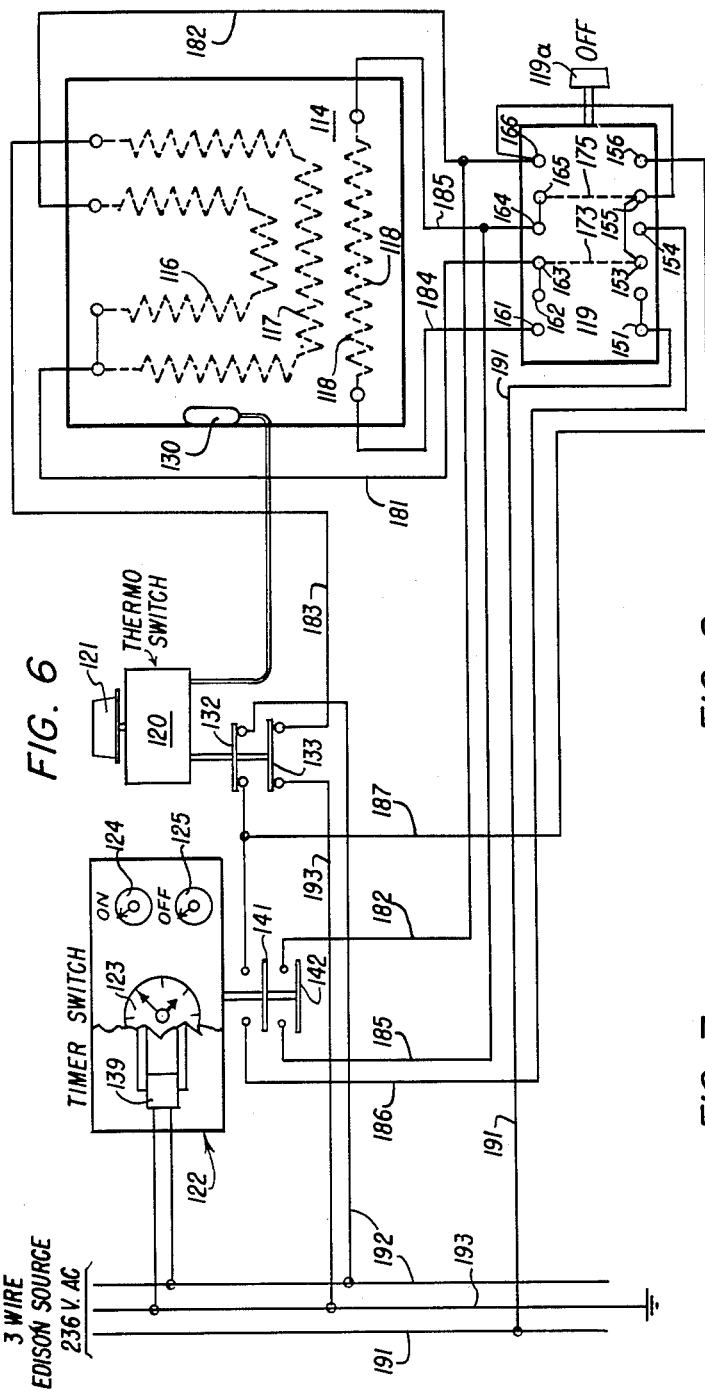
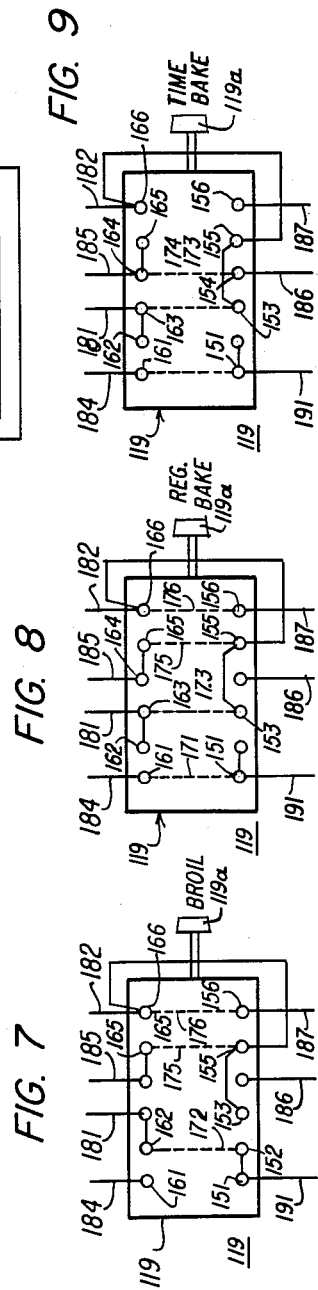
INVENTOR.
Russell T. Simmons
BY
Smith, Olsen, Baird & Gulbrandsen
Attys.

United States Patent Office 2,742,558
Patented Apr. 17, 1956

2,742,558

CONTROL FOR ELECTRIC OVENS

Russell T. Simmons, Bellwood, Ill., assignor to General Electric Company, a New York corporation Application August 21, 1953, Serial No. 375,754

10 Claims. (Cl. 219—20)

The present invention relates to controls for electric ovens, and more particularly to improved controls for electric broiling and baking ovens of the general character disclosed in U. S. Patent No. 2,515,427, granted on July 18, 1950, to Herman W. Schulze.

In the Schulze patent, there is disclosed an electric range comprising a broiling and baking oven provided with first and second heating elements disposed adjacent to the top of the oven cavity and a third heating element disposed adjacent to the bottom of the oven cavity, as well as a unitary control switch of the rotary type having off, broil, regular bake and time bake positions. Also the range comprises a three-wire Edison source of current supply, a manually settable thermostatic switch responsive to the temperature in the oven cavity, and a manually settable timer switch.

In this range, the control switch is operative into its broil position to connect the first and second heating elements in parallel across the outside lines of the Edison source and to open the circuit to the third heating element; and the control switch is operative into its regular bake and time bake positions to connect the second and third heating elements in parallel across the outside lines of the Edison source and to open the circuit to the first heating element. Also in the time bake position of the control switch, the timer switch is included in series with the connection mentioned between one of the outside lines of the Edison source and the associated terminals of the second and third heating elements; and in the regular bake position of the control switch, the timer switch is excluded from the last-mentioned connection. Finally the thermostatic switch is included in series with both of the outside lines of the Edison source.

While the control circuit arrangement for the oven of this range is entirely satisfactory in operation and very economical to manufacture, it is not altogether safe from the standpoint of electrical shock hazard to the cook when the control switch occupies its time bake position and the timer switch occupies its open position and when heating elements of the open resistance coil type are employed. More particularly open resistance coil heating elements, as distinguished from sheathed resistance conductor heating elements, are frequently employed in the oven cavity, these heating elements being suitably supported by and insulated from removable frames or racks respectively supported adjacent to the top of the oven cavity and adjacent to the bottom of the oven cavity in the general manner disclosed in U. S. Patent No. 2,498,583, granted on February 21, 1950, to Herman W. Schulze. More specifically, under the particular circumstances noted, the heating elements are not thermally hot since the timer switch occupies its open position, but one of the outside lines of the Edison source is connected to a terminal of each of the heating elements, whereby the outside line-neutral line voltage of the Edison source is impressed between each of the heating elements and the grounded metal oven liner and the grounded metal body of the range. While the cook is not apt to touch the lower heating element, since it is ordinarily covered by an associated heat deflecting baffle, she might touch either one of the upper heating elements, since the associated heat deflecting baffle is ordinarily disposed thereabove. More specifically the cook might touch one of the upper heating elements incident to placing a roasting pan, or the like, in the oven cavity while she is also in contact with the oven cavity liner or the body of the range, resulting in an electrical shock, or even an electrical burn should her contacts with the parts noted be sufficiently good.

In this range, the other positions of the control switch do not present the electrical shock hazard noted as the various heating elements become thermally hot such a short time interval after the control switch is operated into its broil position or into its regular bake position and since the cook is not apt to touch a thermally hot heating element.

Accordingly it is the general object of the present invention to provide a control for an electric oven that reduces to a minimum shock hazard to the cook in carrying out the various broiling and baking operations in the oven when open resistance coil type heating elements are employed therein.

Another object of the invention is to provide in an electric oven provided with a baking heater of the open resistance coil type, an improved circuit network that includes a manual control switch that may be selectively set into time bake and regular bake positions so as respectively to include and to exclude an associated manually settable timer switch, wherein the touching of one of the baking heaters while the control switch occupies its time bake position and the timer switch occupies its open positions presents no electrical shock hazard to the cook.

Another object of the invention is to provide in an electric baking oven provided with heating elements, a circuit network that includes a manual control switch for selectively connecting the heating elements in different circuit arrangements to obtain the different heating conditions in the oven cavity, wherein the circuit network also embodies an improved arrangement of a manually settable timer switch and a thermostatic switch that is responsive to the temperature of the oven cavity, as well as an arrangement of a control switch pilot lamp responsive to operation of the control switch out of its off position and a thermostatic switch pilot lamp responsive to operation of the thermostatic switch into its closed position.

A further object of the invention is to provide in an electric broiling and baking oven including two heating elements disposed adjacent to the top of the oven cavity and a single heating element disposed adjacent to the bottom of the oven cavity, an improved circuit network that is selectively operative to energize the two upper heating elements for broiling purposes and one of the upper heating elements and the lower heating element for baking purposes, wherein the circuit network includes a manually operable control switch having corresponding off and broil and regular bake and time bake positions, a thermostatic switch for selectively controlling the energization of the heating elements mentioned when the control switch occupies either its regular bake or its time bake position, and a timer switch for selectively controlling upon a clock-time basis the energization of the heating elements mentioned when the control switch occupies its time bake position.

A still further object of the invention is to provide in an electric broiling and baking oven of the character described, an improved arrangement of the control circuit so that the control switch in its time bake position clears at least the two upper heating elements of all voltages thereon so as to eliminate shock hazard.

Further features of the invention pertain to the particular arrangement of the elements of the circuit control network, whereby the above-outlined and additional operating features thereof are attained.

The invention, both as to its organization and method of operation, together with further objects and advantages thereof, will best be understood by reference to the following specification taken in connection with the accompanying drawings, in which Figure 1 is a fragmentary front view of the upper portion of an electric range incorporating a broiling and baking oven control embodying the present invention; Fig. 2 is a diagram of the circuit control network incorporated in the range shown in Fig. 1, all of the switches and circuit controls being illustrated in their normal or off portions; Fig. 3 is a fragmentary portion of the diagram shown in Fig. 2, illustrating the circuit connections when the manual control switch occupies its broil position; Fig. 4 is another fragmentary portion of the diagram shown in Fig. 2, illustrating the circuit connections when the manual control switch occupies its regular bake position; Fig. 5 is a further fragmentary portion of the diagram shown in Fig. 2, illustrating the circuit connections when the manual control switch occupies its time bake position; Fig. 6 is a diagram of a modified form of the circuit control network that may be incorporated in the range shown in Fig. 1, all of the switches and circuit controls being illustrated in their normal or off positions; Fig. 7 is a fragmentary portion of the diagram shown in Fig. 6, illustrating the circuit connections when the manual control switch occupies its broil position; Fig. 8 is another fragmentary portion of the diagram shown in Fig. 6, illustrating the circuit connections when the manual control switch occupies its regular bake position; and Fig. 9 is a further fragmentary portion of the diagram shown in Fig. 6, illustrating the circuit connections when the manual control switch occupies its time bake position. In the diagram of Figs. 2 to 5, inclusive, the control circuit embodies a manually operable control switch of the pushbutton type; and in the diagram of Figs. 6 to 9, inclusive, the modified form of the control circuit embodies a manually operable control switch of the rotary snap type. In the diagram of the heating elements appearing in Figs. 2 to 6, inclusive, a broken line indicates that the corresponding heating element is deenergized; and a solid line indicates that the corresponding heating element is energized at its full rated wattage.

Referring now to Fig. 1 of the drawings, the electric range 10 there illustrated and incorporating the broiling and baking oven control embodying the features of the present invention comprises an upstanding metal body 11 that is provided with a cooking top 12 terminating in an upwardly directed blacksplash 13. A broiling and baking oven cavity 14 is defined in the upper right-hand portion of the body 11 by a metal oven liner, not shown, which oven cavity 14 is provided with a door 15 that is hinged adjacent to the lower edge thereof and movable between open and closed positions. In the upper portion of the oven cavity 14, a first removable frame, not shown, is provided that supports first and second electric heating elements 16 and 17 in a substantially horizontal and coplanar position and in inner and outer relation with respect to each other; and in the lower portion of the oven cavity 14, a second removable frame, not shown, is provided that supports a third electric heating element 18 in a substantially horizontal position. Preferably the heating elements 16, 17 and 18 are of the open resistance coil type and are arranged upon the respective upper and lower frames in the general manner disclosed in the previously-mentioned Schulze Patent No. 2,498,583, it being understood that the electric heating elements are suitably electrically insulated from the associated supporting frames.

The circuit network that is provided for the purpose of selectively controlling the electric heating elements 16, 17 and 18 comprises a manual control switch 19 mounted upon the backsplash 13 that is preferably of the pushbutton type and of the general construction disclosed in U. S. Patent No. 2,431,904, granted on December 2, 1947, to John L. Andrews. Specifically the control switch 19 of the pushbutton type includes four individual manually operable pushbuttons respectively corresponding to the off, broil, regular bake and time bake position thereof. In passing, it is noted that the control switch 19 is so constructed and arranged that as any one of its pushbuttons is manually actuated into its in position, the last-actuated one of its pushbuttons is returned to its out position, and the control switch is set into its control position corresponding to the presently actuated one of its pushbuttons. Also the backsplash 13 carries a thermostatic switch 20 that is provided with a manually operable control dial 21, as well as a timer switch 22 that is provided with a clock face 23, a manually settable on knob 24 and a manually settable off knob 25. Further the backsplash 13 carries a thermostatic switch pilot lamp 26, a control switch pilot lamp 27, and a number of other pushbutton switches 28 for controlling the surface units, not shown, that are also carried by the cooking top 12.

Referring now more particularly to Fig. 2 of the drawings, it is pointed out that the thermostatic switch 20 further comprises a thermal responsive element 30 arranged within the oven cavity 14 and responsive to the temperature therein, as well as a connecting capillary tube 31, and a pair of contact bridging members 32 and 33. It will be understood that the thermostatic switch 20 may be selectively set to maintain any predetermined temperature within the oven cavity 14 by proper manipulation of the control dial 21. Specifically in the thermostatic switch 20, the bridging members 32 and 33 normally bridge or close the associated pairs of contacts and are operated to open the associated pairs of contacts in response to an influence upon the thermal responsive element 30 indicating that the temperature within the oven cavity 14 has reached the temperature previously set by the control dial 21.

Preferably the timer switch 22 is of the general construction of that disclosed in U. S. Patent No. 1,522,988, granted on January 13, 1925, to Henry E. Warren, and comprises a synchronous electric motor 39 of the "Telechron" type, as well as a pair of contact bridging members 41 and 42. The bridging members 41 and 42 normally occupy open positions with respect to the associated pairs of contacts, and are later operated into closed positions with respect to the associated pairs of contacts, at a first preset clock time governed by the on control knob 24, and are still later operated back into their open positions with respect to the associated pairs of contacts, at a second preset clock time governed by the off control knob 25. For example, in the timer switch 22, the on control knob 24 may be set to a first predetermined clock time, such, for example, as 5 o'clock, and the off control knob 25 may be set to a second predetermined clock time, such, for example, as 6 o'clock; whereby the timer switch 22 effects the selective controls noted of the bridging members 41 and 42 at the two previously set clock times so that a baking operation is carried out in a manner more fully explained hereinafter in the oven cavity 14 from 5 o'clock to 6 o'clock.

The manual control switch 19 of the pushbutton type further comprises five incoming terminals 51, 52, 53, 54 and 55, five outgoing terminals 61, 62, 63, 64 and 65, and five individual switch blades 71, 72, 73, 74 and 75, as best shown in Figs. 3, 4 and 5. The individual switch blades 71, etc. are adapted to complete connections between the corresponding individual incoming terminals 51, etc., and the corresponding individual outgoing terminals 61, etc., in the different positions of the control switch 19, as explained more fully hereinafter. Also in the control switch 19, the incoming terminals 51 and 52 are permanently strapped, the incoming terminals 53 and 64 are permanently strapped, and the outgoing terminals 64 and 65 are permanently strapped.

Further the circuit network comprises a first bus 81 commonly connecting together the inside terminals of the heating elements 16, 17 and 18, a second bus 82 terminated by the outgoing terminal 61, a third bus 83 terminated by the outgoing terminal 62, a fourth bus 84 terminated by the outgoing terminal 63 and connected to the outside terminal of the heating element 16, a fifth bus 85 commonly terminated by the outgoing terminals 64 and 65 and connected to the outside terminal of the heating element 18, a sixth bus 86 commonly terminated by the incoming terminals 53 and 54, and a seventh bus 87 terminated by the incoming terminal 55. Further, the circuit network comprises a three-wire Edison source of current supply of 236 volts, single phase A. C. that include first and second outside lines 91 and 92 and a grounded neutral line 93. The outside line 91 is commonly connected to the incoming terminals 51 and 52; and the neutral line 93 is connected to the outside terminal of the heating element 17. The contacts controlled by the bridging member 32 are respectively connected to the outside line 92 and the bus 86; the contacts controlled by the bridging member 33 are respectively connected to the busses 81 and 83; the contacts controlled by the bridging member 41 are respectively connected to the busses 83 and 82; and the contacts controlled by the bridging member 42 are respectively connected to the busses 87 and 86. The winding of the electric motor 39 is connected across the outside line 92 and the neutral line 93; the thermostatic switch pilot lamp 26 is connected across the neutral line 93 and the bus 81; and the control switch pilot lamp 27 is connected across the neutral line 93 and the bus 82.

Considering now the operation of the circuit control network of Figs. 2 to 5, inclusive, in conjunction with the control of the heating elements 16, 17 and 18, it is noted that when the off pushbutton of the control switch 19 is actuated, the five incoming terminals 51 to 55, inclusive, are respectively disconnected from the five outgoing terminals 61 to 65, inclusive, as indicated in Fig. 2; whereby the heating elements 16, 17 and 18 are deenergized, as shown in broken lines in Fig. 2. Also at this time it may be assumed that the oven cavity 14 is cold so that the thermostatic switch 20 operates the bridging members 32 and 33 to close the associated pairs of contacts. Further it may be assumed that the timer switch 22 is operating for clock purposes, but that neither of the control knobs 24 or 25 is set. At this time, the thermostatic switch pilot lamp 27 and the control switch pilot lamp 28 are extinguished.

Now assuming that the cook wishes to perform a broiling operation, she merely operates the broil pushbutton of the control switch 19 setting the circuit elements into the condition shown in Fig. 3; whereby the incoming terminals 51, 52 and 53 are respectively connected to the outgoing terminals 61, 62 and 63 by the respective switch blades 71, 72 and 73. When the control switch 19 is thus operated into its broil position, the heating element 16 is energized across the outside lines 91 and 92 via a circuit including the busses 83, 81, 84 and 86, as well as the bridging members 33 and 32; and the heating element 17 is energized across the outside line 91 and the neutral line 93 via a circuit including the busses 83 and 81, as well as the bridging member 33. Accordingly, the heating element 16 develops its full rated wattage of approximately 3100 watts; and the heating element 17 develops its full rated wattage of approximately 700 watts. Thus in the broil position of the control switch 19, the total 3800 watts is developed in the upper portion of the oven cavity 14, which is desirable for broiling purposes.

Normally when a broiling operation is to be carried out in the oven cavity 14, the control dial 21 of the thermostatic switch 20 is set up to its maximum temperature position and the door 15 is set ajar or cracked to ventilate the oven cavity 14; whereby the thermostatic switch 20 ordinarily exercises no control during the broiling operation. Also at this time the thermostatic switch pilot lamp 26 is illuminated between the bus 81 and the neutral line 93 in order to indicate that the bridging members 32 and 33 of the thermostatic switch 20 occupy their closed positions with respect to the associated pairs of contacts; and the control switch pilot lamp 27 is illuminated between the neutral line 93 and the bus 82 in order to indicate that the control switch 19 occupies other than its off position.

Now assuming that the cook wishes to perform a regular baking operation, she first sets the control dial 21 to the temperature that is desired in the oven cavity 14, and merely operates the regular bake pushbutton of the control switch 19 setting the circuit elements into the condition shown in Fig. 4; whereby the incoming terminals 51, 52 and 54 are respectively connected to the outgoing terminals 61, 62 and 64 by the respective switch blades 71, 72 and 74. When the control switch 19 is thus operated into its regular bake position, the heating element 18 is energized across the outside lines 91 and 92 via the busses 83, 81, 85 and 86 and the contact bridging members 33 and 32 of the thermostatic switch 20; and the heating element 17 is energized across the outside line 91 and the neutral line 93 via the busses 83, 81 and 93 and the contact bridging member 33 of the thermostatic switch 20. Accordingly, the heating element 18 develops its full rated wattage of approximately 3000 watts; while the heating element 17 develops its full rated wattage of approximately 700 watts. Thus in the regular bake position of the control switch 19 the total wattage developed in the oven cavity 14 is approximately 3700 watts; however, substantially 3000 watts of this total wattage is developed by the heating element 18 so that a disproportionate amount of heat is produced in the lower portion of the oven cavity 14, which is necessary in order that a substantially uniform distribution of the heat be effected through the oven cavity 14, which is desirable for regular baking purposes.

During the carrying out of the regular baking operation in the oven cavity 14, when the temperature therein reaches the temperature previously set by the control dial 21 of the thermostatic switch 20, the temperature responsive element 30 is suitably influenced in order to govern the thermostatic switch 20 so that the bridging members 32 and 33 are operated to open the circuits for energizing the heating elements 17 and 18. The temperature within the oven cavity 14 then subsides, and when it reaches a temperature slightly below that previously set by the control dial 21 of the thermostatic switch 20, the temperature responsive element 30 is suitably influenced in order to govern the thermostatic switch 20 so that the bridging members 32 and 33 are again operated to close the circuits for energizing the heating elements 17 and 18. As the regular baking operation is continued, the thermostatic switch 20 operates in the manner described above to hold the previously set temperature in the oven cavity 14. During the regular baking operation the thermostatic switch pilot lamp 26 is illuminated only when the bridging members 32 and 33 of the thermostatic switch 20 occupy their closed positions with respect to the associated pairs of contacts, producing a corresponding indication; and the control switch pilot lamp 27 is illuminated in order to indicate that the control switch 19 occupies other than its off position.

Finally assuming that the cook wishes to perform a time baking operation, she first sets the control dial 21 to the temperature that is desired in the oven cavity 14, and then sets the time during which the time baking operation is desired upon the timer switch 22. Specifically, the on control knob 24 is set at the clock-time it is wished to initiate the baking operation, such, for example, as 5:00 o'clock; and the off control knob 25 is set to the clock-time at which it is wished to arrest the baking operation, such, for example, as 6:00 o'clock. Then the cook operates the time bake pushbutton of the control switch 19 setting the circuit elements into the condition shown in Fig. 5; whereby the incoming terminals 51 and 55 are respectively connected to the outgoing terminals 61 and 65 by the respective switch blades 71 and 75. When the control switch 19 is thus operated into its time bake position, a circuit is prepared for energizing the heating element 18 across the outside lines 91 and 92; which circuit is open at this time at the two contact bridging members 41 and 42 of the timer switch 22; and a circuit is prepared for energizing the heating element 17 across the outside line 91 and the neutral line 93; which circuit is open at this time at the contact bridging member 41 of the timer switch 22.

Thus at this time while the timer switch 22 occupies its open position, there is no potential upon the heating elements 16, 17 and 18; and accordingly, there is no shock hazard to the cook should she inadvertently touch any one of the heating elements 16, 17 or 18 while she is also in contact with the metal liner of the oven cavity 14 or the metal body 11 of the range 10. This consideration is of fundamental importance only with respect to the upper heating elements 16 and 17 that are exposed directly in the top of the oven cavity 14, since the heat distributing shield or baffle normally associated with the lower heating element 18 in the bottom of the oven cavity 14 prevents contact by the cook with the lower heating element 18. In other words, the shock hazard mentioned is really with respect to the upper heating elements 16 and 17; which shock hazard is prevented in the present arrangement.

Continuing now with the time baking operation, when the clock 23 of the timer switch 22 reaches the 5:00 o'clock position set by the on control knob 24, the bridging members 41 and 42 are operated into their closed positions with respect to the associated pairs of contacts completing the circuits for energizing the heating elements 17 and 18. The circuit for energizing the heating element 17 extends from the outside line 91 via the switch blade 71, the bus 82, the contact bridging member 41, the bus 83, the contact bridging member 33, the bus 81 and the heating element 17 to the neutral line 93; while the circuit for energizing the heating element 18 extends from the outside line 91 via the switch blade 71, the bus 82, the contact bridging member 41, the bus 83, the contact bridging member 33, the bus 81, the heating element 18, the bus 85, the switch blade 75, the bus 87, the contact bridging member 42, the bus 86 and the contact bridging member 32 to the outside line 92. Accordingly, at this time the heating elements 17 and 18 respectively develop the full rated wattages of approximately 700 watts and approximately 3000 watts previously mentioned in conjunction with the regular baking operation.

The time baking operation proceeds in a manner identical to that of the regular baking operation previously described, under the control of the thermostatic switch 20 and until the clock 23 reaches the 6:00 o'clock position set by the off control knob 25; whereupon the contact bridging members 41 and 42 are operated back into their normal open positions with respect to the associated pairs of contacts, thereby interrupting the previously traced circuits for energizing the heating elements 17 and 18. Again it will be observed that when the contact bridging members 41 and 42 of the timer switch 22 are returned into their open positions with respect to the associated pairs of contacts, all potentials are removed from the heating elements 16, 17 and 18 in order again to eliminate any shock hazard to the cook should she inadvertently touch any one of the heating elements noted while she is also in contact with the metal liner of the oven cavity 14. At this time, the time baking operation has been completed. In the time baking operation the control of the thermostatic switch pilot lamp 26 and the control of the control switch pilot lamp 27 are the same as described in conjunction with the regular baking operation.

Referring now to Figs. 6 to 9, inclusive, of the drawings, the modified form of the control circuit for the electric range 10 there illustrated and embodying the features of the present invention is substantially identical to the control circuit therefor previously described in conjunction with Figs. 2 to 5, inclusive, except that the manually operable control switch 119 is of the rotary snap type instead of the pushbutton type. Specifically, in Fig. 6, it will be understood that in the oven cavity 114 the arrangement and disposition of the heating elements 116, 117 and 118 are substantially the same as those previously described; and the thermostatic switch 120, and its elements, as well as the timer switch 122, and its elements, are the same as previously described. Moreover, in the control circuit of Fig. 6, the arrangement of the three-wire Edison source of current supply including the outside lines 191 and 192 and the grounded neutral line 193 is the same as that previously described.

More particularly, the manually operable control switch 119 of the rotary snap type is preferably of the general construction and arrangement of that disclosed in U. S. Patent No. 2,203,236, granted on June 4, 1940, to Charles P. Randolph et al.; and of course, it will be understood that the control switch 119 is mounted upon the backsplash 13 of the electric range 10 in the usual manner. Specifically, the control switch 119 of the rotary snap type includes a single rotary operating knob 119a manually operable into corresponding off, broil, regular bake and time bake position, the control switch 119 including six incoming terminals 151 to 156, inclusive, six outgoing terminals 161 to 166, inclusive, and six individual switch blades 171 to 176, inclusive, as best shown in Figs. 7, 8 and 9. The individual switch blades 171, etc., are adapted to complete connections between the corresponding individual incoming terminals 151, etc., and the corresponding individual outgoing terminals 161, etc. in the different positions of the control switch 119, as explained more fully hereinafter. In the control switch 119, the incoming terminals 151 and 152 are permanently strapped, the incoming terminals 153 and 155 and the outgoing terminal 166 are permanently strapped together, the outgoing terminals 162 and 163 are permanently strapped, and the outgoing terminals 164 and 165 are permanently strapped. When the control switch 119 occupies its off position the incoming terminals 153 and 155 are respectively connected to the outgoing terminals 163 and 165 by the respective switch blades 173 and 175, as illustrated in Fig. 6; when the control switch 119 occupies its broil position, the incoming terminals 152, 155 and 156 are respectively connected to the outgoing terminals 162, 165, and 166 by the respective switch blades 172, 175 and 176, as illustrated in Fig. 7; when the control switch 119 occupies its regular bake position, the incoming terminals 151, 153, 155 and 156 are respectively connected to the outgoing terminals 161, 163, 165 and 166 by the respective switch blades 171, 173, 175 and 176, as illustrated in Fig. 8; and when the control switch 119 occupies its time bake position, the incoming terminals 151, 153 and 154 are respectively connected to the outgoing terminals 161, 163, 164 by the respective switch blades 171, 173 and 174, as illustrated in Fig. 9.

As illustrated in Fig. 6, the inside terminals of the heating elements 116 and 117 are commonly connected to a bus 181; the outside terminals of the heating elements 116 and 117 are respectively connected to two busses 182 and 183; and the inside and outside terminals of the heating element 118 are respectively connected to two busses 184 and 185. The commonly connected incoming terminals 151 ad 152 are connected to the outside line conductor 191; the commonly connected incoming terminals 153 and 155 and the outgoing terminal 166 are connected to the bus 182; the incoming terminal 154 is connected to a bus 186; the incoming terminal 156 is connected to a bus 187; the outgoing terminal 161 is connected to the bus 184; the commonly connected outgoing terminals 162 and 163 are connected to the bus 181; and the commonly connected outgoing terminals 164 and 165 are connected to the bus 185. The contacts of the pair controlled by the bridging member 141 are respectively connected to the busses 186 and 187; the contacts of the pair controlled by the bridging member 142 are respectively connected to the busses 185 and 182; the contacts of the pair controlled by the bridging member 132 are respectively connected to the bus 187 and the outside line 192; and the contacts of the pair controlled by the bridging member 133 are respectively connected to the neutral line 193 and the bus 183.

Accordingly, when the control switch 119 occupies its off position, all of the circuits for the heating elements 116, 117 and 118 are open.

When the control switch 119 occupies its broil position, a circuit is completed for energizing the heating element 116 across the outside lines 191 and 192, and a circuit is completed for energizing the heating element 117 across the outside line 191 and the neutral line 193. The circuit for energizing the heating element 116 extends from the outside line 191 via the switch blade 172, the bus 181, the heating element 116, the bus 182, the switch blade 176, the bus 187 and the contact bridging member 132 to the outside line 192; while the circuit for energizing the heating element 117 extends from the outside line 191 via the switch blade 172, the bus 181, the heating element 117, the bus 183, and the bridging member 133 to the neutral line 193. In the broiling operation, the dial 121 of the thermostatic switch 120 is normally set at a sufficiently high temperature so that the heat responsive element 130 does not selectively control the bridging members 132 and 133 of the thermostatic switch 120, the oven door 15 being set ajar or cracked, as previously noted.

When the control switch 119 occupies its regular bake position, a circuit is completed for energizing the heating element 118 across the outside lines 191 and 192, and a circuit is completed for energizing the heating element 117 across the outside line 192 and the neutral line 193. The circuit for energizing the heating element 118 extends from the outside line 191 via the switch blade 171, the bus 184, the heating element 118, the bus 185, the switch blade 175, the bus 182, the switch blade 176, the bus 187 and the bridging member 132 to the outside line 192; while the circuit for energizing the heating element 117 extends from the outside line 192 via the bridging member 132, the bus 187, the switch blade 176, the bus 182, the switch blade 173, the bus 181, the heating element 117, the bus 183 and the bridging member 133 to the neutral line 193. In the regular baking operation, the dial 121 of the thermostatic switch 120 is set to the temperature that is desired in the oven cavity 114; whereby the heat responsive element 130 selectively controls the thermostatic switch 120 to cause the bridging members 132 and 133 to be moved selectively into their open and closed positions opening and closing the circuit for energizing the heating elements 117 and 118 for the purpose of maintaining the desired temperature within the oven cavity 114, in the manner previously explained.

When the control switch 119 occupies its time bake position, a circuit is prepared for energizing the heating element 118 across the outside lines 191 and 192, and a circuit is prepared for energizing the heating element 117 across the outside line 192 and the neutral line 193; which circuits are not only under the control of the thermostatic switch 120, but are also under control of the timer switch 122. More particularly, the timer switch 122 closes the two circuits mentioned at the set on clock time and subsequently opens the two circuits mentioned at the set off clock time; while the thermostatic switch 120 selectively opens and closes the two circuits mentioned for the purpose of holding the previously set temperature in the oven cavity 114. More particularly, when the control switch 119 occupies its time bake position, the circuit for energizing the heating element 118 extends, when completed, from the outside line 191 via the switch blade 171, the bus 184, the heating element 118, the bus 185, the switch blade 174, the bus 186, the bridging member 141, the bus 187 and the bridging member 132 to the outside line 192; and the circuit for energizing the heating element 117 extends, when completed, from the outside line 192 via the bridging member 132, the bus 187, the bridging member 141, the bus 186, the switch blade 174, the bus 185, the bridging member 142, the bus 182, the switch blade 173, the bus 181, the heating element 117, the bus 183, and the bridging member 133 to the neutral line 193.

It is noted that when the control switch 119 occupies its time bake position and the contact bridging members 141 and 142 of the timer switch 122 occupy their open positions with respect to the associated pairs of contacts, no potentials are present upon the upper heating elements 116 and 117, thereby eliminating any shock hazard to the cook should she inadvertently touch either one of the heating elements noted while she is also in contact with the metal liner of the oven cavity 114.

In view of the foregoing, it is apparent that there has been provided an improved control for an electric broiling and baking oven that is efficient in operation, simple in action, and safe in use.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric broiling and baking oven comprising first and second electric heating elements disposed adjacent to the top of said oven, a third electric heating element disposed adjacent to the bottom of said oven, said first heating element having a considerably higher wattage rating than said second heating element and about the same wattage rating as said third heating element, a three-wire Edison electric current supply source provided with first and second outside lines and a neutral line, a first circuit for connecting said first heating element across said first and second outside lines, a second circuit for connecting said second heating element across said first outside line and said neutral line, a third circuit for connecting said third heating element across said first and second outside lines, a unitary control switch having broil and regular bake and time bake positions, said control switch being operative into its broil position to complete said first and second circuits, said control switch being operative into its regular bake position to complete said second and third circuits, said control switch being operative into its time bake position to prepare said second and third circuits, a timer switch selectively settable to desired on and off clock times and operative respectively to close and to open both said prepared second and third circuits at said respectively set on and off clock times when said control switch occupies its time bake position, and a thermostatic switch associated with said oven and responsive to the temperature therein, said thermostatic switch being selectively operative to open and to close both said second and third circuits when said control switch occupies either its regular bake position or its time bake position.

2. The electric broiling and baking oven set forth in claim 1, wherein said timer switch in its operation to open said second circuit clears said second heating element of voltages thereon to eliminate shock hazard.

3. An electric broiling and baking oven comprising first and second electric heating elements disposed adjacent to the top of said oven, a third electric heating element disposed adjacent to the bottom of said oven, said first heating element having a considerably higher wattage rating than said second heating element and about the same wattage rating as said third heating element, a three-wire Edison electric current supply source provided with first and second outside lines and a neutral line, the inside terminals of said first and second and third heating elements being commonly connected together, the outside terminal of said second heating element being directly connected to said neutral line, a first path for connecting said first outside line to said common inside terminals, a second path for connecting said second outside line to the outside terminal of said first heating element, a third path for connecting said second outside line to the outside terminal of said third heating element, a unitary control switch having broil and regular bake and time bake positions, said control switch being operative into its broil position to complete said first and second paths, said control switch being operative into its regular bake position to complete said first and third paths, said control switch being operative into its time bake position to prepare said first and third paths, a timer switch selectively settable to desired on and off clock times and operative respectively to close and to open both said prepared first and third paths at said respectively set on and off clock times when said control switch occupies its time bake position, and a thermostatic switch associated with said oven and responsive to the temperature therein, said thermostatic switch being selectively operative to open and to close both said first and third paths when said control switch occupies either its regular bake position or its time bake position.

4. The electric broiling and baking oven set forth in claim 3, wherein said timer switch in its operation to open said first and third paths clears each of said heating elements of voltages thereon to eliminate shock hazard.

5. An electric broiling and baking oven comprising first and second electric heating elements disposed adjacent to the top of said oven, a third electric heating element disposed adjacent to the bottom of said oven, said first heating element having a considerably higher wattage rating than said second heating element and about the same wattage rating as said third heating element, a three-wire Edison electric current supply source provided with first and second outside lines and a neutral line, the inside terminals of said first and second heating elements being commonly connected together, a first path for connecting said first outside line to said common inside terminals, a second path for connecting said second outside line to the outside terminal of said first heating element, a third path for connecting said neutral line to the outside terminal of said second heating element, a fourth path for connecting said first outside line to the inside terminal of said third heating element, a fifth path for connecting said second outside line commonly to the outside terminal of said third heating element and to said common inside terminals, a unitary control switch having broil and bake positions, said control switch being operative into its broil position to complete said first and second and third paths, said control switch being operative into its bake position to complete said third and fourth and fifth paths, and a thermostatic switch associated with said oven and responsive to the temperature therein, said thermostatic switch being selectively operative to open and to close both said third and fifth paths when said control switch occupies its bake position.

6. An electric broiling and baking oven comprising first and second electric heating elements disposed adjacent to the top of said oven, a third electric heating element disposed adjacent to the bottom of said oven, said first heating element having a considerably higher wattage rating than said second heating element and about the same wattage rating as said third heating element, a three-wire Edison electric current supply source provided with first and second outside lines and a neutral line, the inside terminals of said first and second heating elements being commonly connected together, a first path for connecting said first outside line to said common inside terminals, a second path for connecting said second outside line to the outside terminal of said first heating element, a third path for connecting said neutral line to the outside terminal of said second heating element, a fourth path for connecting said first outside line to the inside terminal of said third heating element, a fifth path for connecting said second outside line commonly to the outside terminal of said third heating element and to said common inside terminals, a unitary control switch having broil and regular bake and time bake positions, said control switch being operative into its broil position to complete said first and second and third paths, said control switch being operative into its regular bake position to complete said third and fourth and fifth paths, said control switch being operative into its time bake position to complete said third and fourth paths and to prepare said fifth path, a timer switch selectively settable to desired on and off clock times and operative respectively to close and to open said prepared fifth path at said respectively set on and off clock times when said control switch occupies its time bake position, and a thermostatic switch associated with said oven and responsive to the temperature therein, said thermostatic switch being selectively operative to open and to close both said third and fifth paths when said control switch occupies either its regular bake position or its time bake position.

7. The electric broiling and baking oven set forth in claim 6, wherein said timer switch in its operation to open said fifth path clears both said first and second heating elements of voltages thereon to eliminate shock hazard.

8. An electric broiling and baking oven comprising first and second electric heating elements disposed adjacent to the top of said oven, a third electric heating element disposed adjacent to the bottom of said oven, said first heating element having a considerably higher wattage rating than said second heating element and about the same wattage rating as said third heating element, a three-wire Edison electric current supply source provided with first and second outside lines and a neutral line, a first circuit for connecting said first heating element across said first and second outside lines, a second circuit for connecting said second heating element across said first outside line and said neutral line, a third circuit for connecting said third heating element across said first and second outside lines, a unitary control switch having off and broil and bake positions, said control switch being operative into its broil position to complete said first and second circuits, said control switch being operative into its bake position to complete said second and third circuits, a thermostatic switch associated with said oven and responsive to the temperature therein, said thermostatic switch being selectively operative to open and to close both said second and third circuits when said control switch occupies its bake position, a first pilot lamp, means responsive to operation of said control switch into either its broil position or its bake position for illuminating said first pilot lamp and responsive to operation of said control switch into its off position for extinguishing said first pilot lamp, a second pilot lamp, and means responsive to operation of said thermostatic switch to close said second and third circuits for illuminating said second pilot lamp and responsive to operation of said thermostatic switch to open said second and third circuits for extinguishing said second pilot lamp.

9. The electric broiling and baking oven set forth in claim 1, wherein said control switch is of the manually operable pushbutton type.

10. The electric broiling and baking oven set forth in claim 1, wherein said control switch is of the manually operable rotary snap type.

References Cited in the file of this patent

UNITED STATES PATENTS

| | | |
|---|---|---|
| 2,203,236 | Randolph et al. | June 4, 1940 |
| 2,240,340 | Mills et al. | Apr. 29, 1941 |
| 2,409,434 | Jacobs | Oct. 15, 1946 |
| 2,515,427 | Schulze | July 18, 1950 |
| 2,556,450 | Schulze | June 12, 1951 |
| 2,614,199 | Fallon | Oct. 14, 1952 |
| 2,654,824 | Schroeder | Oct. 6, 1953 |
| 2,663,786 | Illian et al. | Dec. 22, 1953 |